United States Patent

[11] 3,627,699

| [72] | Inventors | Newton N. Goldberg<br>Pittsburgh, Pa.;<br>James L. Fergason, Kent, Ohio |
|---|---|---|
| [21] | Appl. No. | 820,661 |
| [22] | Filed | Apr. 30, 1969 |
| [45] | Patented | Dec. 14, 1971 |
| [73] | Assignee | Westinghouse Electric Corporation<br>Pittsburgh, Pa. |

[54] LIQUID CRYSTAL CHOLESTERIC MATERIAL AND SENSITIZING AGENT COMPOSITION AND METHOD FOR DETECTING ELECTROMAGNETIC RADIATION
16 Claims, No Drawings

[52] U.S. Cl....................................................... 252/408,
23/230 LC, 250/83, 260/205, 260/410.5, 260/469,
350/160 P
[51] Int. Cl........................................................G01n 21/02,
G01t 1/08

[50] Field of Search............................................ 252/408;
23/230 LC; 350/160, 160 P; 250/83; 260/205,
207, 469, 410.5

[56] References Cited
UNITED STATES PATENTS

| 3,114,836 | 12/1963 | Fergason...................... | 250/83 |
| 3,401,262 | 9/1968 | Fergason...................... | 250/83 |

*Primary Examiner*—John T. Goolkasian
*Assistant Examiner*—M. E. McCamish
*Attorneys*—F. Shapoe and Alex Mich, Jr.

ABSTRACT: Electromagnetic radiation in the frequency range of $10^{12.5}$ to $10^{17}$ cycles per second is detected, using a cholesteric liquid-crystal material to which there has been added, in the case of radiation of lower frequency, a suitable oil or oil-soluble dye, and in the case of radiation of higher frequency, a phototropic material such as beta-carotene or cholesteryl p-phenylazophenyl carbonate, a novel compound.

LIQUID CRYSTAL CHOLESTERIC MATERIAL AND SENSITIZING AGENT COMPOSITION AND METHOD FOR DETECTING ELECTROMAGNETIC RADIATION

BACKGROUND OF THE INVENTION

1. Field of the Invention

This invention relates to novel compositions of matter, these being materials that are liquid crystals of the cholesteric phase, into which there has been incorporated, in accordance with the frequency of the electromagnetic radiation to be detected thereby, an additional material in an effective amount, this comprising either a suitable dye or a phototropic substance. The invention further relates to a method of detecting such radiation comprising exposing such compositions of matter, alone or in combination with other suitable materials, to such radiation. It further relates to articles made with the use of such compositions of matter or furnishing, when in use, an instance of the practice of the above-mentioned method.

2. Description of the Prior Art:

Many materials are known that exhibit cholesteric-phase liquid crystals within a certain temperature range. See, for example, the compositions mentioned in U.S. Pat. No. 3,114,836 in the passage from column 6, line 61 to column 7, line 21. See also, for example, the compositions mentioned in British Pat. No. 1,041,490, in the passage from line 5 to line 102 of page 4.

As mentioned in the above patents, cholesteric liquid-crystal compositions have numerous interesting properties, one of which is that these compositions have a temperature range within which they exhibit noticeable changes in color, generally as the result of relatively small changes in temperature. For the most part, these changes in color take place quite rapidly when the composition is exposed to a new temperature. Prior to the instant invention, however, there have not been known and studied any materials that contain cholesteric-phase liquid crystals and are known to be responsive to radiation within the frequency range hereinabove mentioned.

Devices for detecting radiation of the frequency range hereinabove mentioned incident thereon have, before this invention, usually comprised films containing suitable sensitive material, with it being necessary that the film be subjected to a separate developing operation before the quantity of radiation that it has received can be determined. Devices using such film have been built and used, despite the fact that the need for such separate development operation makes the use of such devices not only a great deal more inconvenient but also substantially more costly than the use of a direct-reading device, such as may be obtained with the present invention.

There is also known a physical phenomenon that is called "phototropism" or "photochromism." This phenomenon is that certain substances, when subjected to suitable activating radiation, change their apparent color. The phenomenon is to be distinguished from fluorescence or phosphorescence, which involves an actual absorption and reemission of light energy. The phototropism phenomenon is discussed in considerable detail in a paper written by Glenn H. Brown and Wilfrid G. Shaw, Reviews of Pure and Applied Chemistry, Vol. 11, No. 1, pages 2-32, March 1961. As those authors explain, there appears to be a substantial number of different possible explanations for the phototropic behavior of a substance. Some isomerize, others from tautomers or free radicals, and still others appear to form molecular aggregations. Some appear to undergo chemical reaction with, for example, oxygen of the air or with water, since their color change does not take place in vacuum or in the absence of water. The phototropic change sometimes occurs very slowly, and sometimes quite rapidly. Some substances give a phototropic change that seems quite temperature-dependent, or requires activating radiation of a fairly specific frequency, while other substances appear quite insensitive to these parameters. In particular, there are a number of azo compounds that appear to give a phototropic effect as a result of cis-trans isomerization, with the change being very rapid, on the order of a microsecond, matching the order or rapidity of the color change in cholesteric liquid-crystal material in response to a change in temperature. So far as we are aware, however, there is no teaching in the prior art of the practice of mixing with a cholesteric liquid-crystal material any such phototropic substance.

BRIEF SUMMARY OF THE INVENTION

Cholesteric-phase liquid-crystal compositions are made that show sensitivity to radiation in the frequency range mentioned above by incorporating, in the mixtures of material subjected to such radiation, suitable additional materials. In the case of the detection of radiation in the frequency range of $10^{12.5}$ to $10^{14}$ cycles per second, i.e., for the detection of infrared radiation or heat, there is incorporated, in the composition of matter consisting essentially of materials of the cholesteric-phase liquid-crystal type, a suitable oil-soluble dye, particularly such a dye having a high absorption coefficient, such as a brilliant green for example, or an oil-soluble black azo dye. Within the visible range, i.e., from $10^{14}$ to $10^{15}$ cycles per second, any of a great number of suitable phototropic materials, among which may be mentioned the anils, hydrazones, osazones, semicarbazones, stilbene derivatives, fulgides and the like, may be used. For the detection of ultraviolet radiation, i.e., radiation in the frequency range of $10^{15}$ to $10^{17}$ cycles per second, such compositions containing effective amounts of still other materials, such as beta-carotene or cholesteryl p-phenylazophenyl carbonate, may be used. The invention may be of use in imaging devices, i.e., devices for the purpose indicated in U.S. Pat. No. 3,114,836, as well as in other ways that will suggest themselves to persons skilled in the art.

DESCRIPTION OF THE PREFERRED EMBODIMENTS

In one general aspect, the present invention concerns a method for detecting electromagnetic radiation that comprises preparing a homogeneous composition that contains at least an effective amount of a derivative of cholesterol or cholestanol, with the composition that is being prepared being of such nature, as respects the temperature range within which it exhibits a color play, that considering the amount of sensitizing compounds that is present therein (anything from a small but an effective amount up to a major portion, such as about 60 percent, of the total composition, by weight) and the approximate temperature of the intended use, and also the intensity of the radiation that is to be detected, there is obtained, whenever the composition is exposed to radiation of the wavelength and intensity and dosage to be detected, a noticeable change in color of the composition. To this end, the composition is prepared by being put into a suitable physical form, such as by being made into a film having a thickness of about 5 to 50 microns disposed on a suitable substrate, such as plastic film of polyethylene terephthalate provided with a coating of black paint or the like.

It is to be understood that it will be essential to use, for the material sensitive to electromagnetic radiation within the frequency range mentioned above, a material comprising a major part of the cholesterogenic material, i.e., a material that, as mentioned above, undergoes within a particular temperature range characteristic of the material a color play, changing in color from red through violet, with this cholesterogenic material having incorporated therein, as taught in accordance with the present invention, an additional material suitable for use in the detection of electromagnetic radiation within the frequency range intended to be detected.

In accordance with the present invention, there is used, as an additive to cholesterogenic material, an oil-soluble dye that is capable of absorbing the radiation within a particular frequency range. The dye that is used is particularly sensitive to or absorptive of radiation in frequency ranges corresponding to the frequency range of radiation that is intended to be detected. If, for example, it may be desirable to obtain detection of the amount of radiation of the infrared or heat type produced by, for example, an atomic blast, there is added to the cholesterogenic material an oil-soluble dye, especially one having a high absorption coefficient, such as brilliant green, methyl orange, National azo black, Heliogen Blue BK powder, Heliogen Green GA powder, green gasoline dye (such as that sold by Fisher Scientific Company as "Fisher 6025"), blue gasoline dye (such as that sold by Fisher Scientific Company as "Fisher 6530"), or yellow dye (such as that sold by Fisher Scientific Company as "Fisher 6520"). Other dyes that may be used include azo dyes, including such aminoazobenzene derivatives as "Celliton" and "Scarlet B" and such betanapthol derivatives as "Scarlet GG." Also included are triphenylmethane dyes, such as Malachite Green, diphenylmethane dyes such as auramine, acridine dyes such as acridine orange, and indigo dyes such as indigo purpurin or indigo white.

Essential to the idea of the invention is that there is incorporated, in an otherwise suitable cholesterogenic material, a substance that responds to and absorbs radiation of a particular wavelength, with the effect being that the structure, and therefore the color response of the cholesterogenic material, is thus substantially altered, a relatively small change in the energy content of the film or the like of cholesterogenic material being transformed as the result of the presence of the sensitizing material in the film or the like, into a change that is a great deal more vivid and recognizable, namely, in the color response of the bulk of cholesterogenic material itself.

Further in accordance with the invention, there are compositions sensitive to visible light, and these comprise cholesterogenic materials within which there has been incorporated a suitable phototropic material in at least an effective amount, generally somewhat less than 20 percent by weight. Among the phototropic materials that may be mentioned as being useful are the anils (or Schiff bases) such as salicylidine-aniline or salicylidine-meta-toluidine. Also included among the suitable phototropic materials are the hydrazones, such as benzalphenylhydrazone, benzal-beta-napthylhydrazone, and cinnamalphenylhydrozone. Also included are the osazones, such as the phenylosazones of anisil and benzil, as well as semicarbazones, such as cinnamaldehyde semicarbazone and para-methoxycinnamaldehyde phenyl semicarbazone. Further included within the phototropic materials are stilbene derivatives, such as 4,4'-diformamido-2,2'-stilbene-disulphonic acid and 4,4'-acetamide-2,2'-stilbene-disulphonic acid. Also included among the phototropic materials are the fulgides, which are reaction products of ketones with succinic anhydride.

The foregoing phototropic materials are included in cholesterogenic materials when the frequency of the electromagnetic radiation to be detected is between $10^{14}$ and $10^{15}$ cycles per second. For the detection of the electromagnetic radiation of somewhat greater frequency, such as about $10^{15}$ to $10^{17}$ cycles per second, i.e., for the detection of electromagnetic radiation in the general range of the ultraviolet, the use of additives somewhat different is preferred. For example, it has been discovered that by the addition of 5 parts of beta-carotene to a cholesterogenic material consisting essentially of 40 parts by weight of cholesteryl nonanoate and 60 parts by weight of oleyl cholesteryl carbonate, there is obtained a composition that exhibits a color change from green to blue upon its exposure to ultraviolet radiation. Other substances that might be used in place of beta-carotene include other azo compounds that will undergo rapid cis-trans isomerization when activated by radiation. Such azo compounds will not, generally, themselves exhibit cholesteric-phase liquid crystals. One azo compound that is capable of such isomerization and also does form cholesteric-phase liquid crystals is cholesteryl p-phenylazophenyl carbonate.

As will be well understood by those skilled in the art, the cholesterogenic material within which the sensitizing material is incorporated may vary considerably in chemical composition, depending upon the requirements of the application involved. It will be desirable, in most instances, that the basic cholesterogenic material to which the sensitizing material is added exhibit its color play at about the temperature of use or slightly higher, and that the material used have a speed of response to changes in the conditions to which it is subjected adequate for the intended purposes (some cholesterogenic materials will change color 20 times in a second, but others may require several hours to make one change; compositions of the former kind are useful where a condition is to be read directly, without a permanent record being made, but compositions of the latter kind are more useful for applications that involve exposures over a long period of time, with it being desired that a permanent record be made of the observed changes, if any).

Whatever the nature of the sensitizing material used, the preferred procedure is substantially the same, once that a suitably sensitized cholesterogenic material has been prepared. The sensitized cholesterogenic material is dissolved in a suitable organic solvent such as benzene, chloroform, petroleum ether or the like, and this is applied to a suitable substrate, such as film of polyethylene terephthalate or other clear plastic film painted, on the side opposite that to which the cholesterogenic material is applied, with black paint. In some instances the sensitive material, for example the oil-soluble black dye, will absorb the radiation and serve as an appropriate background. It is possible, of course, to use a plastic film that is not provided with a black point backing or black dye, but in such cases, the cholesterogenic material will, as is well understood, exhibit colors that, at a given temperature, or under given conditions or exposure, are the complement of those exhibited by a specimen having a black color; for example, a specimen made of a film having a black paint backing and exhibiting a red color would, if the black paint backing were omitted, appear green. The solution is sprayed on the backing material, and then the organic solvent is permitted to evaporate therefrom, to leave a film of stratum having a thickness of, for example, about 5 to 50 microns. The film, so treated, is then utilized in a manner suitable to the intended application. The stratum may also be formed from capsules containing the cholesterogenic material. The encapsulating material may be a translucent plastic film, for example.

Part of the teaching of the present invention that is considered unobvious to a person of ordinary skill in the art is that it is possible, with a relatively small amount of sensitizing material incorporated in the cholesteric liquid-crystal material, to obtain a relatively vivid change in the appearance of the cholesteric liquid-crystal material. Another item not obvious to a person of ordinary skill in the art, prior to being apprised of this invention, is that it is not necessary, in order to obtain sufficient energy absorption to get the liquid-crystal film to change color, to use an amount of dye or other sensitizing material so great that there would be other difficulties, such as having the color of the dye mask any changes in the color of the liquid-crystal material, or having the amount of sensitizing material added deprive the total composition of its effective liquid-crystal properties. Another difficulty to be expected is that the sensitizing material might itself also absorb visible radiation attempting to leave the cholesteric liquid-crystal material to such an extent that it would be difficult or impossible to notice any color changes as result of changes in radiation incident upon the film of cholesteric liquid-crystal material containing the sensitizing material. Indeed, with some combinations of materials, these very difficulties may sometimes be encountered but according to the present invention, it is taught that when the amount of sensitizing material used is kept sufficiently low, these difficulties are avoided and at the same time it is usually possible to obtain the beneficial effects indicated above.

The invention disclosed above is illustrated by the following specific examples

EXAMPLE I

To a piece of polyethylene terephthalate film about 0.00025 inch thick, there is applied on one side a coating of black spray enamel. Then, on the other side of the film there is applied a liquid made by mixing into 500 milliliters of petroleum ether the following materials: 5 grams of brilliant green dye, 10 grams of oleyl cholesteryl carbonate, 10 grams of cholesteryl benzoate, and 25 grams of cholesteryl nonanoate. This is permitted to dry, to leave a stratum about 20–30 microns thick, on the one side of the film and at a temperature of about 50° C. this film appears green. Maintained at about such temperature, with electromagnetic radiation of infrared frequency of sufficient amplitude incident thereon, the film turned bluish-green.

EXAMPLE II

To a piece of polyethylene terephthalate film about 0.00025 inch thick, there is applied on one side a coating of black spray enamel. Then, to the other side of the film, there is applied a liquid made by mixing into 500 milliliters of petroleum either the following materials: 5 grams of methyl orange dye, 10 grams of oleyl cholesteryl carbonate, 10 grams of cholesteryl benzoate, and 25 grams of cholesteryl nonanoate. This is permitted to dry, to leave a stratum about 20–30 microns thick on the one side of the film, and at a temperature of about 20° C. this film appears orange. Maintained at about such temperature, with electromagnetic radiation of infrared frequency of sufficient amplitude incident thereon, the film turns yellow or brown.

EXAMPLE III

To a piece of polyethylene terephthalate film about 0.00025 inch thick, there is applied on one side a coating of black spray enamel. Then, to the other side of the film, there is applied a liquid made by mixing into 500 milliliters of petroleum either the following materials: 5 grams of methyl orange dye, 10 grams of oleyl cholesteryl carbonate, 10 grams of cholesteryl benzoate, and 25 grams of cholesteryl nonanoate. This is permitted to dry, to leave a stratum about 20–30 microns on the one side of the film, and at a temperature of about 50° C. the film appears green. Maintained at about such temperature, with electromagnetic radiation of visible frequency of sufficient amplitude thereon, the film turns bluish-green or blue.

EXAMPLE IV

To a piece of polyethylene terepthalate film about 0.00025 inch thick, there is applied on one side a coating of black spray enamel. Then to the other side of the film, there is applied a liquid made by mixing into 500 milliliters of benzene of the following materials: 5 grams of 4,4'-diformamido- 2,2'-stilbene-disulphonic acid, 10 grams of oleyl cholesteryl carbonate, 10 grams of cholesteryl benzoate, and 25 grams of cholesteryl nonanoate. This is permitted to dry, to leave a stratum about 20–30 microns thick on the one side of the film, and at a temperature of about 50° C. the film appears green. Maintained at about such temperature, with electromagnetic radiation of visible frequency of sufficient amplitude incident thereon, the film turns bluish-green or blue.

EXAMPLE V

To a piece of polyethylene terepthalate film about 0.00025 inch thick, there is applied on one side a coating of black spray enamel. Then, to the other side of the film there is applied a liquid made by mixing into 500 milliliters of a mixture of petroleum ether in choloroform of the following materials: 30 grams of oleyl cholesteryl carbonate, 20 grams of cholestryl nonanoate, and 1 gram of cholesteryl paraphenylazophenyl carbonate. (Cholesteryl paraphenylazophenyl carbonate is a novel compound, prepared as indicated below in example VI.) The liquid thus applied to the other side of the polyethylene terephthalate film is permitted to dry, leaving a stratum about 0.25 micron thick on the one side of the film. After the solvent evaporates, a further layer of polyethylene terephthalate is placed over the liquid crystal material, in vacuum. The film thus prepared is exposed to ultraviolet radiation, using a filtered AH-4 mercury photoflood. Ordinary negatives may be used to place an image on the films for evaluation of gray scale and resolution. It is found that approximately 40 shades of discrimination are available, using this technique, and the spatial resolution is in excess of 20 lines per millimeter. The effects of the ultraviolet radiation on the liquid-crystal material are reversible. After being heated to about 150° C. for 30 seconds, or being allowed to remain at 30° C. for 8 hours, the film appeared as if it had not been exposed.

EXAMPLE VI

Cholesteryl paraphenylazophenyl carbonate is prepared as follows. To a flask, there are added, dissolved in 75 milliliters of benzene, 22.5 grams (0.05 mol) of cholesteryl chloroformate. There are added 3.9 grams (0.05 mol) pyridine dissolved in 5 milliliters of benzene. Then, to the flask, there is added a suspension of 10.0 grams of paraphenylazophenol (0.05 mol) in benzene. The materials in the flask are then heated to a reflux temperature and retained at the reflux temperature for 2 hours with stirring. The resultant reaction mixture was cooled and filtered to remove the precipitated pyridine hydrocholoride. To the filtrate, methanol is added, causing the product, cholesteryl paraphenylazophenyl carbonate, to be precipitated from the solution. This precipitate is then recrystallized from the benzene-methanol solution in a yield of better than 90 percent, based upon the quantity of cholesteryl chloroformate charged. It exhibits a melting point range of 166°–167.5° C. and gives a bright, vivid color play at a temperature slightly above that. The novel compound may be used as taught in example V, as well as in many other ways that will suggest themselves to persons of ordinary skill in this art.

EXAMPLE VII

Example V was repeated, except that twice as much of the novel carbonate was used. The film thus obtained was slightly more sensitive to ultraviolet radiation, but the results are otherwise the same.

EXAMPLE VIII

Example V was repeated, except that seven times as much of the novel carbonate was used. The results were substantially the same as in example VII (no noticeable improvement in sensitivity), with the further development that the liquid-crystal material comprising the film tended to crystallize to a true solid.

The above-mentioned tendency to undergo true-solid crystallization was observed whenever amounts of the novel carbonate as great as five times the amount used in example V were used, and when as much as 10 times as the quantity, of novel carbonate used in example V was used, there was obtained a material that ceased to respond to ultraviolet light.

EXAMPLE IX

Example V was repeated, except that there was used in place of the novel carbonate an equal weight of cholesteryl paraphenylazobenzoate. The results were the same as in example V.

EXAMPLE X

Example IX was repeated, except that three times as much of the benzoate was used. The resultant film exhibited sensitivity to ultraviolet light, but it was difficult to maintain this quantity of benzoate dissolved in other components of the cholesteric liquid-crystal mixture.

EXAMPLE XI

Example V was repeated, except that half of the novel carbonate was replaced with the above-mentioned benzoate. The results were the same as in example V.

EXAMPLE XII

Example XI was repeated, except that there was used five times as much as both the benzoate and the novel carbonate. The results were similar to those observed in example V, except that the cholesteric-phase liquid-crystal material tended to crystallize to a true solid within several minutes.

EXAMPLE XIII

Example V was repeated, except that there was used in place of the novel carbonate an equal weight of beta-carotene. The same results were observed.

Beta-carotene, cholesteryl paraphenylazophenyl carbonate, or other azobenzene compounds capable of undergoing rapid cis-trans isomerization in response to the action of electromagnetic radiation may thus be used as sensitizing materials in cholesteric-phase liquid-crystal compositions in accordance with the present invention.

While we have shown and described herein certain embodiments of our invention, we intend to cover as well any change or modification therein which may be made without departing from its spirit and scope.

We claim as our invention:

1. A homogeneous composition of matter capable of exhibiting a visual change when exposed to electromagnetic radiation comprising a material exhibiting cholesteric-phase liquid crystals and an effective amount of a sensitizing agent responsive to electromagnetic radiation in the frequency range of $10^{12}$ to $10^{17}$ cycles per second, said response being either a change in color or an absorption of the radiation.

2. A composition of matter as defined in claim 1, characterized in that said agent is an oil-soluble dye which absorbs electromagnetic radiation in the frequency range of $10^{12}$ to $10^{14}$ cycles per second.

3. The composition of claim 2 wherein said dye is selected from the group consisting of brilliant green, methyl orange, black azo dyes, Heliogen Blue BK powder, Heliogen Green GA powder, gasoline dyes, aminozaobenzene derivatives, beta-naphthol derivatives, triphenylmethane dyes, diphenylmethane dyes, acridine dyes, and indigo dyes.

4. A composition of matter as defined in claim 1, characterized in that said agent is a material responsive to radiation in the frequency range of $10^{14}$ to $10^{15}$ cycles per second and comprises a phototropic material selected from the group consisting of the anils, hydrazones, osazones, semicarbazones, stilbene derivatives, and fulgides.

5. A composition of matter as defined in claim 1, characterized in that said agent is responsive to electromagnetic radiation in the frequency range of $10^{15}$ to $10^{17}$ cycles per second and is selected from the group consisting of beta-carotene, cholesteryl p-phenylazophenyl carbonate, and azobenzene compounds capable of undergoing rapid cis-trans isomerization in response to electromagnetic radiation.

6. A composition of matter as defined in claim 1, characterized in that said cholesteric-phase liquid-crystal material consists essentially of a mixture comprising 60 weight-percent of oleyl cholesteryl carbonate, and 40 weight-percent of cholesteryl nonanoate.

7. A composition as defined in claim 6, characterized in that said agent is responsive to electromagnetic radiation in the frequency range of $10^{12}$ to $10^{14}$ cycles per second and comprises a dye selected from the group consisting of brilliant green, methyl orange, National azo oil black, Heliogen Blue BK powder, Heliogen Green GA powder, green gasoline dye, blue gasoline dye, yellow gasoline dye, aminoazobenzene derivatives, beta-naphthol derivatives, triphenylmethane dyes, diphenylmethane dyes, acridine dyes, and indigo dyes.

8. A composition as defined in claim 6, characterized in that said agent is material responsive to radiation in the frequency range of $10^{14}$ to $10^{15}$ cycles per second and comprises a phototropic material selected from the group consisting of the anils, hydrazones, osazones, semicarbazones, stilbene derivatives, and fulgides.

9. A composition as defined in claim 6, characterized in that said agent is responsive to electromagnetic radiation in the frequency range of $10^{15}$ to $10^{17}$ cycles per second and is selected from the group consisting of beta-carotene, cholesteryl p-phenylazophenyl carbonate, and azobenzene compounds capable of undergoing rapid cis-trans isomerization in response to electromagnetic radiation.

10. A method of detecting electromagnetic radiation in the frequency range of $10^{12}$ to $10^{17}$ cycles per second, said method comprising preparing a composition as defined in claim 1 in the form of a stratum having a thickness of about 0.25 to 50 microns, exposing said film and examining said film to detect a color change therein indicative of its having been exposed to said radiation.

11. A method as defined in claim 10, characterized in that said method serves to detect electromagnetic radiation in the frequency range of $10^{12}$ to $10^{14}$ cycles per second and in that said composition being further characterized in that said agent is responsive to electromagnetic radiation in the frequency range of $10^{12}$ to $10^{14}$ cycles per second and comprises a dye selected from the group consisting of brilliant green, methyl orange, National azo oil black, Heliogen Blue BK powder, Heliogen Green GA powder, green gasoline dye, blue gasoline dye, yellow gasoline dye, aminoazobenzene derivatives, beta-naphthol derivatives, triphenyl methane dyes, diphenylmethane dyes, acridine dyes, and indigo dyes.

12. A method as defined in claim 10, further characterized in that said method serves to detect electromagnetic radiation in the frequency range of $10^{14}$ to $10^{15}$ cycles per second, said composition being further characterized in that said agent is a material responsive to radiation in the frequency range of $10^{14}$ to $10^{15}$ cycles per second and comprises a phototropic material selected from the group consisting of the anils, hydrazones, osazones, semicarbazones, stilbene derivatives, and fulgides.

13. A method as defined in claim 10, said method serving to detect electromagnetic radiation in the frequency range of $10^{15}$ to $10^{17}$ cycles per second, said composition being further characterized in that said agent is responsive to electromagnetic radiation in the frequency range of $10^{15}$ to $10^{17}$ cycles per second and is selected from the group consisting of beta-carotene, cholesteryl p-phenylazophenyl carbonate, and azobenzene compounds capable of undergoing rapid cis-trans isomerization in response to electromagnetic radiation.

14. A homogeneous composition of matter capable of exhibiting a visual change in response to exposure to electromagnetic radiation comprising, in combination, a cholesterogenic material having liquid-crystal properties and a substance exhibiting phototropic behavior.

15. The composition of claim 14 wherein the phototropic substance is an azobenzene compound capable of undergoing rapid cis-trans isomerization in response to electromagnetic radiation.

16. A homogeneous composition of matter capable of exhibiting a visual change in response to exposure to electromagnetic radiation comprising, in combination, a cholesterogenic material having liquid-crystal properties and an oil-soluble dye capable of absorbing radiation.

* * * * *